INVENTOR.
Robert H. Hellmann
BY
D. D. McGraw
ATTORNEY 3,606,756
BRAKE CONTROLS FOR DRIVER TRAINING CARS
Robert H. Hellmann, Grand Blanc, Mich., assignor to General Motors Corporation, Detroit, Mich.
Filed Apr. 24, 1970, Ser. No. 31,692
Int. Cl. F15b 7/00
U.S. Cl. 60—54.5　　　　　　　　　　3 Claims

ABSTRACT OF THE DISCLOSURE

An auxiliary brake control for a driver training car which includes a slave cylinder unit installed between the usual master cylinder and the brake booster, or the master cylinder and the service pedal push rod in a manual brake system. An auxiliary brake pedal and hydraulic cylinder actuable by a passenger provides fluid pressure to the slave unit for brake actuation independently of the usual brake pedal.

---

The invention relates to an improved method of auxiliary brake control in motor vehicles. When a vehicle is used for the training of drivers, it is desirable to provide the instructor with a brake control which enables the instructor to apply the brake.

Prior art in this field includes various mechanical and hydraulic linkages installed beneath the dash which connect an auxiliary brake pedal and the main brake pedal. This invention provides an improved auxiliary brake control means offering comparative ease of installation.

The present invention is comprised of an auxiliary brake pedal and hydraulic cylinder, a slave cylinder unit, and a connecting hydraulic conduit. The auxiliary pedal and cylinder assembly is actuable by an instructor seated in the front passenger seat. The slave cylinder unit is installed between the usual master cylinder and the brake booster or the master cylinder and the service pedal push rod in a manual brake system. The hydraulic conduit connects the auxiliary cylinder and the slave cylinder. The slave cylinder provides a rigid movable member which transmits the braking force from the brake booster to the master cylinder, thus allowing the driver to apply the vehicle brake in the usual manner. The actuation of the auxiliary pedal by the instructor introduces pressure to the slave cylinder causing the piston enclosed therein to actuate the master cylinder independent of brake application by the driver.

Figure 1:
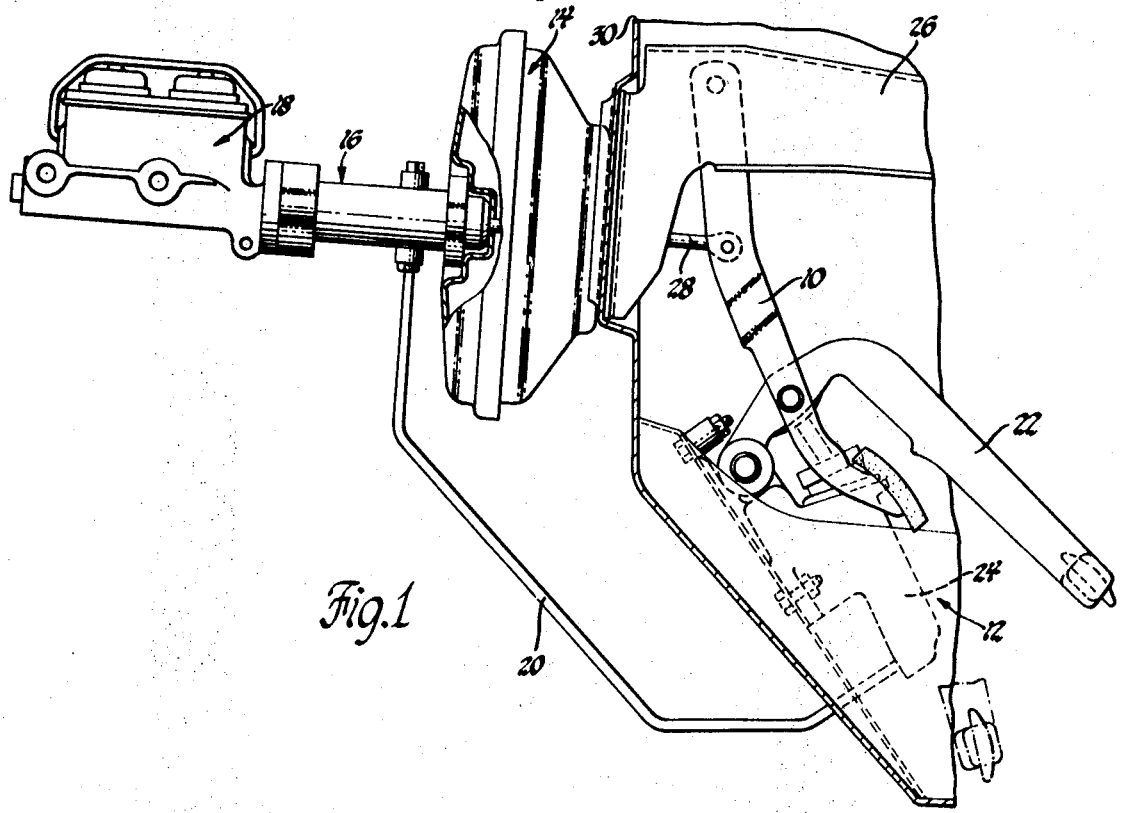
FIG. 1 is an elevation view of a typical brake control arrangement embodying the invention, and having parts broken away and in section.

The brake control system includes a main brake pedal 10, an auxiliary pedal and cylinder assembly 12, a brake booster assembly 14, a slave cylinder assembly 16, a master cylinder assembly 18, and a hydraulic brake fluid conduit 20. The auxiliary pedal and cylinder assembly includes an auxiliary pedal 22 and an auxiliary cylinder 24. The auxiliary pedal drives a piston in the auxiliary cylinder causing pressurization of the hydraulic brake fluid. The auxiliary pedal and cylinder assembly is secured to the floor on the passenger side of the vehicle. The main brake pedal 10 is pivotally attached to a brace 26 of the vehicle body. A pedal pushrod 28 is pivotally connected to the main brake pedal and extends through the vehicle firewall 30 to the brake booster assembly 14.

Figure 2:
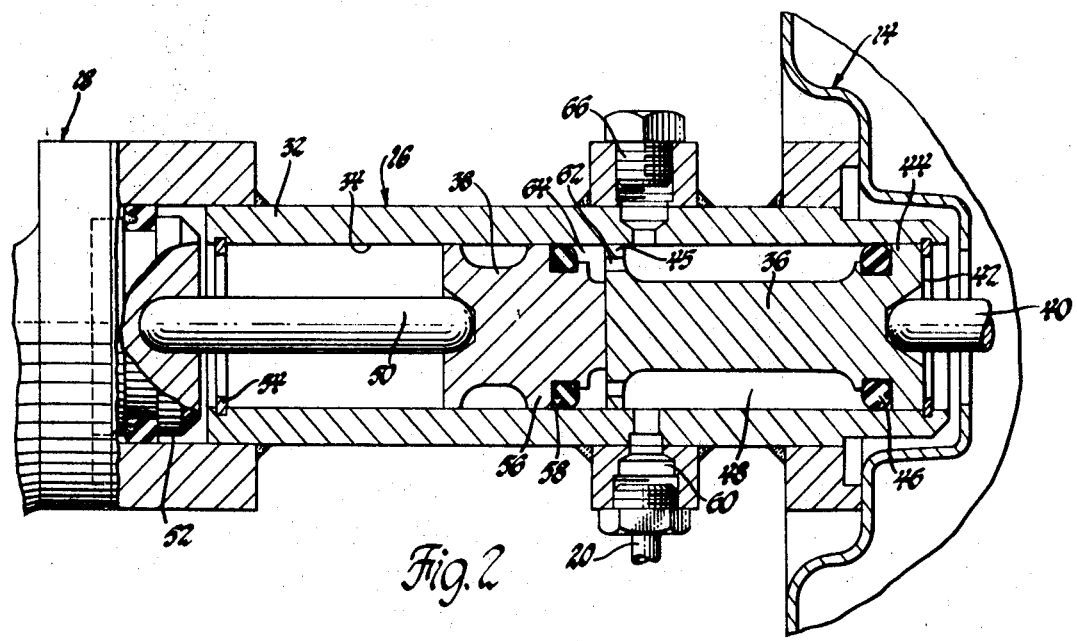
FIG. 2 is a sectional view of the slave cylinder assembly of FIG. 1.

The slave cylinder assembly 16 is attached axially forward of the brake booster assembly 14 and axially rearward of the master cylinder assembly 18. The slave cylinder assembly, shown in detail in FIG. 2, includes a slave cylinder housing 32 having a smooth bore 34 therethrough. A rearward slave piston 36 and a forward driven piston 38 are axially slidable therein in tandem relation. The rearward end of the slave piston has formed therein a depression in which the booster assembly output pushrod 40 is engaged. A stop ring 42 locates the slave piston rearwardly in its rest position. The slave piston has end lands 44 and 45 slidably engaged with the cylinder bore 34; the rearward land 44 forming a seat for a seal 46, and the forward land 45 containing a port 62. Intermediate to these lands the slave piston is of reduced diameter thereby forming with the cylinder bore an annular fluid chamber 48.

The forward end of the driven piston 38 has formed therein a depression in which the slave pushrod 50 is engaged. This slave pushrod extends forwardly to engage the master cylinder piston 52. A stop ring 54 limits the forward travel of the driven piston upon actuation. The rearward land 56 of the driven piston forms a seat for the seal 58. The driven piston includes a length of reduced diameter rearward of the rearward land 56, forming with bore 34 and slave piston 36 an expansible chamber 64.

A fluid inlet 60 extends through the wall of the slave cylinder housing 32 axially rearward of the forward land 45 of slave piston 36 and in continuous communication with the fluid chamber 48. The hydraulic fluid conduit 20 communicates with the fluid inlet 60 and the auxiliary pedal and cylinder assembly 12 to form a closed hydraulic circuit. The bleeder screw 66 is provided to facilitate maintenance of the system. Upon introduction of hydraulic pressure through the fluid conduit 20, fluid inlet 60, fluid chamber 48, and the port 62, the abutting walls of the slave piston and the driven piston are separated resulting in axially forward movement of the driven piston.

OPERATION

The vehicle driver initiates brake application by depressing the main brake pedal 10. This imparts axial movement to the pedal pushrod 28 actuating the booster assembly 14. The booster amplifies the pedal force in the usual manner and the resulting axial movement of the booster output pushrod 40 causes unitary axial movement of the slave piston 36, driven piston 38, and slave pushrod 50, thus operating the master cylinder piston 52 and applying the brakes in the usual manner. Relaxation of pedal force allows all elements to return to the brake released position.

The instructor initiates brake application by depressing the auxiliary pedal 22. This action generates fluid pressure in the auxiliary cylinder 24. The displaced fluid is communicated under pressure to the slave cylinder assembly by the fluid conduit 20. This fluid enters the fluid chamber 48 and is communicated to the expansible chamber 64 through port 62 in proportion to the pedal force. As the fluid pressure increases, the driven piston 38 and the slave pushrod 50 engaged therein are moved axially forward to operate the master cylinder piston 52. Rearward reaction of the slave piston is prevented by the stop ring 42. Relaxation of pedal force allows all elements to return to a brake released position.

Thus an auxiliary brake control is provided which allows actuation of the vehicle brakes independent of actuation of the main brake pedal and the brake booster.

What is claimed is:

1. An auxiliary means of vehicle brake control comprising:
    an auxiliary pedal and auxiliary hydraulic cylinder operated thereby to provide a source of fluid power;
    a slave cylinder assembly attached intermediate a master cylinder actuating push rod and a master cylinder assembly, containing therein means movable to transmit force from the push rod to the master cylinder assembly, said movable means including a plurality of movable elements separable in response to fluid pressure therebetween to actuate the master cylinder assembly independent of actuation of the push rod; and conduit means extending between and communicating with the auxiliary cylinder and the slave cylinder to provide fluid pressure between the movable elements for the actuation of the master cylinder assembly independent of actuation of the push rod.

2. The brake control of claim 1 in which the master cylinder actuating push rod is the power booster push rod provided as a part of a brake booster assembly, the brake control being further characterized by:

said slave cylinder assembly being attached to the axially forward end of the brake booster assembly and to the axially rearward end of the master cylinder assembly;

said movable means including a plurality of movable elements being a driven piston and an abutting slave piston slidably enclosed in said slave cylinder;

said pistons arranged such that the power booster push rod engages the slave piston whereby application of force to the main brake pedal imparts axial movement to said push rod causing unitary axial movement of the slave piston and the abutting driven piston and slave push rod engaged therein, said slave push rod engaging the master cylinder piston and upon being driven forwardly causing application of the vehicle brakes.

3. The brake control of claim 2 further characterized by:

the slave piston having at each end a shoulder slidably engaged with the cylinder bore, and intermediate the said shoulders a length of piston having a reduced diameter cooperating with the cylinder bore to form a fluid chamber, the driven piston abutting said slave piston and separable therefrom to form an expansible chamber between said pistons, means providing fluid communication between said expansible chamber and said fluid chamber, a pressurized fluid inlet entering the slave cylinder and connected with said conduit means and in continuous fluid communication with the fluid chamber, said inlet introducing pressurized fluid to the expansible chamber through said fluid communication providing means and said fluid chamber, thus causing axially forward motion of the driven piston and slave pushrod to actuate the master cylinder independent of actuation of the main pedal and booster, and stop means located axially rearward of the slave piston to isolate the brake booster from reaction forces.

References Cited

UNITED STATES PATENTS

| | | | |
|---|---|---|---|
| 3,076,313 | 2/1963 | Stromberg | 60—54.5 |
| 3,155,105 | 11/1964 | Yanna | 60—54.5 |
| 3,358,447 | 12/1967 | Branson | 60—54.5E |
| 3,436,917 | 4/1969 | Branson | 60—54.5E |
| 3,076,314 | 2/1963 | Stromberg | 60—54.6 |
| 2,299,932 | 10/1942 | Scott | 60—54.6E |

MARTIN P. SCHWADRON, Primary Examiner

A. M. ZUPCIC, Assistant Examiner

U.S. Cl. X.R.

60—54.5P; 188—106